United States Patent

[11] 3,601,449

| [72] | Inventor | Herbert Buerger<br>Walton, N.Y. |
|---|---|---|
| [21] | Appl. No. | 851,165 |
| [22] | Filed | Aug. 19, 1969 |
| [45] | Patented | Aug. 24, 1971 |
| [73] | Assignee | Del Krome Corp.<br>Walton, N.Y. |

[54] WHEEL, WHEEL COVER AND RETAINING RING ASSEMBLY
4 Claims, 4 Drawing Figs.

| [52] | U.S. Cl. | 301/37 P |
|---|---|---|
| [51] | Int. Cl. | B60b 7/04 |
| [50] | Field of Search | 301/37, 108 |

[56] References Cited
UNITED STATES PATENTS

| 2,231,183 | 2/1941 | Flandes | 301/37 C (X) |
|---|---|---|---|
| 2,459,568 | 1/1949 | Lyon | 301/37 X |
| 3,413,037 | 11/1968 | Spisak | 301/37 (C) |
| 3,416,840 | 12/1968 | Gibbings | 301/37 (P) |
| 3,521,933 | 7/1970 | Buerger | 301/37 (B) |

*Primary Examiner*—Richard J. Johnson
*Attorney*—J. B. Felshin

ABSTRACT: A wheel cover is assembled with a metal retaining ring which also grips the rim of a wheel. Thereafter the cover can be pried off while leaving the retaining ring on the wheel. The cover has an annular cylindrical flange. The retaining ring comprises springfingers gripping the outer side of the flange, alternating with springfingers gripping the inner side of the flange. The cover is made of nonmetallic material.

PATENTED AUG24 1971
3,601,449
INVENTOR.
HERBERT BUERGER
BY
J. B. Felshin
ATTORNEY
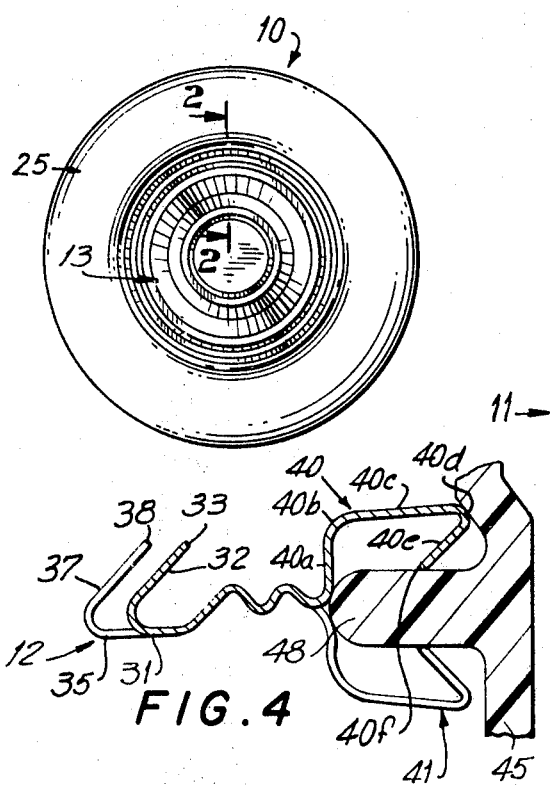
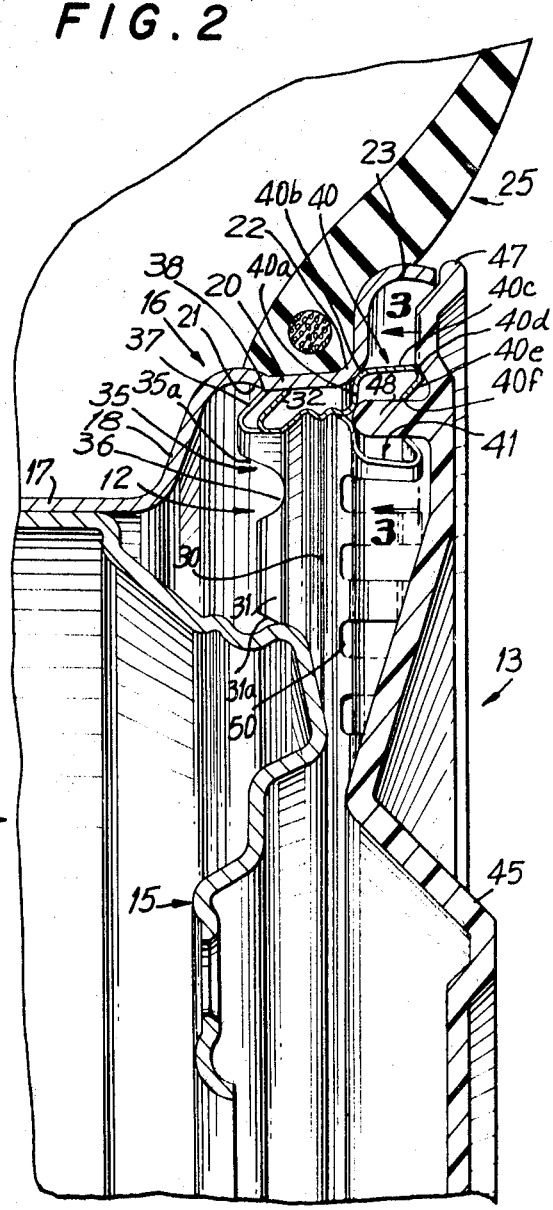
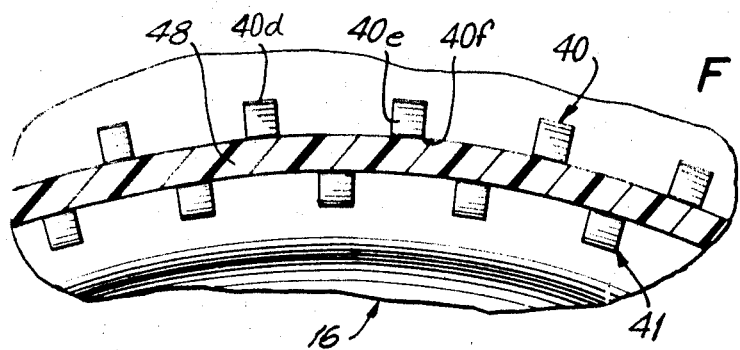

3,601,449

WHEEL, WHEEL COVER AND RETAINING RING ASSEMBLY

BACKGROUND OF THE INVENTION

1. FIELD OF THE INVENTION

This invention relates to decorative, protective cover assemblies for wheels of vehicles such as automobiles.

2. DESCRIPTION OF THE PRIOR ART

Nonmetallic covers for wheels are known in U.S. Pat. No. 2,416,840. This patent shows such a cover gripped by a retaining ring and gripping the wheel in such a way that the cover cannot be pried off without the retaining ring coming off with the cover.

SUMMARY OF THE INVENTION

One object of this invention is to provide an assembly of the character described so constructed that the cover and retaining ring can be assembled with the wheel, and the cover can then be pried off leaving the retaining ring on the wheel.

Another object of this invention is to provide in an assembly of the character described, a wheel cover having an annular cylindrical flange, and a retaining ring having an annular cylindrical flange, and a retaining ring having a first set of springfingers gripping the outer surface of said flange, and a second set of springfingers alternating with the fingers of the first set and gripping the inner surface of said flange.

Still another object of this invention is to provide an assembly of the assembly described, in which said retaining shall is made of spring manufacture, said cover is made of nonmetallic material, and said retaining ring having spring fingers to grip the inner surface of the rim of the wheel, and the spring fingers of the retaining ring which grip the flange on the cover being more flexible than the springfingers of said retaining ring which grip the rim of the wheel.

Yet another object of this invention is to provide a strong, rugged and durable assembly of the character described which shall be relatively inexpensive to manufacture, easy to manipulate, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of invention will be indicated in the following claims.

BRIEF DESCRIPTION OF THE DRAWING

FIG. 1 is a front vertical view of an automobile wheel, retaining ring and wheel cover assembly embodying the invention;

FIG. 2 is an enlarged partial cross-sectional view taken on line 2–2 of FIG. 1

FIG. 3 is a cross-sectional view taken on line 3–3 of FIG. 2; and

FIG. 4 is an enlarged cross-sectional view of the retaining ring and cover.

DESCRIPTION OF THE PREFERRED EMBODIMENT

Referring now in detail to the drawing, 10 designates an assembly embodying the invention. Said assembly comprises generally of a wheel 11, a retaining ring 12 and a protective and decorative wheel cover 13.

The wheel 11 may be of a conventional construction and comprises a wheel body 15 carrying a wheel rim 16. The wheel rim 16 comprises a repressed annular web 17 from which an annular portion 18 inclines radially and axially outwardly. Extending from said annular portion 18, axially outwardly, is an intermediate rim flange 20 which may have an annular undershoulder 21, as shown in FIG 2 of the drawing. Extending from said flange 20 is a junction shoulder 22 from which a peripheral flange 23 extends first generally radially outwardly and then axially outwardly. A tire 25 of usual construction may be mounted on the tire rim 16.

The retaining ring 12 is preferably made of spring steel. It is annular and comprises an annular, transversely intermediate portion 30 which may be corrugated in transverse cross section. Extending axially inwardly from said intermediate portion 30 is a first set of shorter spaced spring fingers 31 having out-turned radially and axially outwardly inclined spring tongues 32, the outer end edges 33 of which are squared off and grippingly engage the inner surface of intermediate flange 20, forwardly of the undershoulder 21. A second set of longer spring fingers 35 alternate with spring fingers 31 and are spaced therefrom by notches 36. Extending from springfingers 35 are out-turned spring tongues or tabs 37 which incline radially and axially outwardly and have squared off outer end edges 38 which grip the inner surface of intermediate flange 20 in the region of the undershoulder 21. It will be observed that the fingers 31, 35 have inclined side edges 31a, 35a on opposite sides thereof.

The spring tabs 32, 37 rather tightly grip flange 20 to prevent the retainer ring 12 from being turned relative to or pried off the wheel except with difficulty.

Extending from the outer side of the intermediate portion 30 is a set of outer springfingers 40 alternating with inner springfingers 41 of a second set of fingers. The cover 13 may be made of synthetic plastic material or other nonmetallic material and comprises a body or disc 45 which may be of ornamental or decorative shape, covering the outside of the wheel body 15 and rim 16 and having an outer peripheral edge 47 disposed outside of and adjacent the peripheral edge of flange 23. Extending axially inwardly from and integrally formed with the body 45 is cylindrical flange 48 received between the two sets of fingers 40, 41 and gripped thereby.

Spring fingers 40 each comprises a portion 40a extending radially outwardly and from which extends a shoulder 40b which may contact wheel rim shoulder 22. Extending axially outwardly from shoulder 40b is a portion 40c disposed in outwardly spaced parallel relation to flange 48 of the cover 13. Extending from portion 40c of the springfinger 40 is a radially inwardly turned shoulder 40d from which a spring tab or tongue 40e is inclined radially and axially inwardly. Spring tongues 40e have rounded outer edges 40f contacting the outer surface of flange 48 so as not to dig into the flange. The edges 40f are on a circle whose diameter is that of the outer surface of flange 48 when in contact therewith.

Springfingers 41 are similar to and symmetrically disposed relative to springfingers 40 and circumferentially offset with respect thereto and the end edges thereof contact the inner cylindrical surface of said flange 48. Between springfingers 40 and 41 are notches 50. The springfingers 40, 41 are narrower, longer and more flexible than the springfingers 31, 35. The grip of fingers 40, 41 on the cylindrical flange 48 is less than the grip of the springfingers 31, 35 on the intermediate flange 20 of the wheel rim 16. This is due to the fact that fingers 40, 41 are narrower, longer and more flexible than fingers 31, 35. The side edges of fingers 40, 41 are in parallel planes.

Thus, when the cover is gripped by the retainer ring, the assembled cover and ring may be pushed onto the wheel. Thereafter, the cover can be pried off the retainer ring leaving the ring on the wheel. Should the cover break it can easily be replaced. The ring 12 grips the wheel harder than the cover.

The squared off tabs 32, 37 grip the flange 20 with greater tension than the rounded off edges 40f grip the flange 48.

The use of outer and inner grip fingers 40, 41 helps to center the cover, whereby application of the cover to the retainer ring is facilitated. The reason that the cover can be pried off the retainer ring while leaving the ring on the wheel, is that the ring grips the wheel with greater tension than it grips the cover.

It will thus be seen that there is provided an article in which the several objects of this invention are achieved, and which is well adapted to meet the conditions of practical use.

As possible embodiments might be made of the above invention, and as various changes might be made in the embodiments above set forth, it is to be understood that all matter herein set forth or shown in the accompanying drawings, is to be interpreted as illustrative only.

I claim:

1. A retaining ring of spring metal having an annular intermediate portion, spring means extending to one side of said intermediate portion to grip a rim of a wheel, spring means extending to the other side of said intermediate portion to grip a wheel cover, said means to grip a wheel cover comprising an outer circle of springfingers having radially inwardly extending spring tongues alternating with an inner circle of springfingers having radially outwardly extending spring tongues, whereby a cylindrical flange of a wheel cover can be inserted between said outer circle of springfingers and said inner circle of springfingers.

2. The combination of claim 1, the spring means extending from said one side of said intermediate portion comprising springfingers, the fingers of said inner and outer circles of springfingers being more flexible than the spring fingers of the spring means which extend from said one side of said intermediate portion.

3. The combination of claim 2, said springfingers of said outer and inner circles of springfingers being longer and narrower than the springfingers which extend from said one side of said intermediate portion.

4. The combination of claim 3, and having tongues provided with rounded outer edges, the springfingers extending from said one side of said intermediate portions having tongues provided with squared-off end edges.